(12) United States Patent
Kwong et al.

(10) Patent No.: US 10,134,149 B2
(45) Date of Patent: Nov. 20, 2018

(54) IMAGE PROCESSING

(71) Applicant: Cortexica Vision Systems Limited, London (GB)

(72) Inventors: Jeffrey Ng Sing Kwong, London (GB); Spyridon Gidaris, London (GB); Yin Li, London (GB); Anil Anthony Bharath, London (GB); Muhammad Awais, London (GB); Eduardo Vazquez, London (GB); Yu Qian, London (GB)

(73) Assignee: Cortexica Vision Systems Limited, London (GB)

(*) Notice: Subject to any disclaimer, the term of this patent is extended or adjusted under 35 U.S.C. 154(b) by 0 days.

(21) Appl. No.: 15/066,972

(22) Filed: Mar. 10, 2016

(65) Prior Publication Data

US 2016/0189396 A1 Jun. 30, 2016

Related U.S. Application Data

(63) Continuation of application No. PCT/EP2014/069570, filed on Sep. 12, 2014.

(30) Foreign Application Priority Data

Sep. 13, 2013 (GB) .................................. 1316372.0

(51) Int. Cl.
*G09G 5/00* (2006.01)
*G06T 7/40* (2017.01)
(Continued)

(52) U.S. Cl.
CPC ............ *G06T 7/403* (2013.01); *G06K 9/4623* (2013.01); *G06K 9/4652* (2013.01); *G06T 7/44* (2017.01); *G06T 2207/10024* (2013.01)

(58) Field of Classification Search
CPC .. G06T 7/403; G06T 7/44; G06T 7/40; G06T 7/41; G06T 7/42; G06K 9/4623; G06K 9/4652
(Continued)

(56) References Cited

U.S. PATENT DOCUMENTS 8,369,595 B1 2/2013 Derakhshani et al.
8,483,450 B1* 7/2013 Derakhshani ...... G06K 9/00597
382/115
(Continued)

FOREIGN PATENT DOCUMENTS

EP 1221662 A2 7/2002

OTHER PUBLICATIONS

Yue, J., Li, Z., Liu, L., & Fu, Z. (2011), "Content-based image retrieval using color and texture fused features", Mathematical and Computer Modelling, 54(3-4), 1121-1127.*
(Continued)

*Primary Examiner* — Xiao Wu
*Assistant Examiner* — Sarah Lhymn
(74) *Attorney, Agent, or Firm* — EIP US LLP

(57) ABSTRACT

A method of generating a descriptor of at least part of an image includes receiving image data representing the at least part of the image. The image data is processed to identify at least one texture characteristic of the at least part of the image, thereby generating texture data indicative of a texture of the at least part of the image. The texture data is processed with the image data, thereby generating weighted texture data. A descriptor of the at least part of the image is generated using the weighted texture data.

20 Claims, 11 Drawing Sheets

(51) Int. Cl.
*G06K 9/46* (2006.01)
*G06T 7/44* (2017.01)

(58) Field of Classification Search
USPC ............... 345/418, 581, 582, 583, 589, 591
See application file for complete search history.

(56) References Cited

U.S. PATENT DOCUMENTS

| | | | | |
|---|---|---|---|---|
| 2002/0122587 | A1* | 9/2002 | Lim et al. | G06F 17/3025 382/165 |
| 2005/0262067 | A1* | 11/2005 | Lee et al. | G06K 9/6212 |
| 2011/0142335 | A1* | 6/2011 | Ghanem | G06F 17/3025 382/165 |

OTHER PUBLICATIONS

Yi-Ren Yeh et al., "A Novel Multiple Kernel Learning Framework for Heterogeneous Feature Fusion and Variable Selection".

International Search Report and Written Opinion issued to the WO application PCT/EP2014/069570 dated Jan. 20, 2015.
Portilla J et al "Texture Synthesis-by-analysis method based on a multiscale early-vision model" Optical engineering, soc. of photo-optical instrumentation engineers, Bellingham, vol. 35, No. 8, Aug. 1, 1996 pp. 0091-3286.
Anil Anthony Bharath et al: "Phase Invariant Keypoint Detection", Digital Signal Processing, 2007 15th International Conference on, IEEE, PI Jul. 1, 2007, pp. 447-450 XP031125591.
Schmid C Ed—Institute of Electrical and Electronics Engineers: "Constructing models for content-based image retrieval" Proceedings 2001 IEEE Conference on Computer Vision and Pattern Recognition. CVPR 2001. Kauai, Hawaii, Dec. 8-14, 2001; vol. 2, Dec. 8, 2001, pp. 39-45, XP010584098.
Bharath A A et al: "A Steerable Complex Wavelet Construction and Its Application to Image Denoising" IEEE Transactions on Image Processing, IEEE Service Center, Piscataway, NJ, US, vol. 14, No. 7, Jul. 1, 2005, pp. 948-959, XP011133597.
Jun Zhang et al: "Local Energy Pattern for Texture Classification Using Self-Adaptive Quantization Thresholds" IEEE Transactions on Image Processing, IEEE Service Center, Picataway, NJ, US, vol. 22, No. 1, Jan. 1, 2013, pp. 31-42, XP011492242.

* cited by examiner

IMAGE PROCESSING

CROSS-REFERENCE TO RELATED APPLICATIONS

This application is a continuation of International Application No. PCT/EP2014/069570, filed Sep. 12, 2014, which claims the benefit of GB Application No. 1316372.0, filed Sep. 13, 2013. Each of the above-referenced patent applications is incorporated by reference herein in its entirety.

BACKGROUND OF THE INVENTION

Field of the Invention

The present application relates to a method of generating a descriptor for at least part of an image.

Description of the Related Technology

The identification and retrieval of images in an image database that are similar to an input image is a useful task, for example in the field of consumer product recommendation, for example for fashion apparel and accessories.

There are a number of known methods that exploit features at the image level. In a known method, a descriptor is generated for a complete image. This known method has the disadvantage of not being able to account for occlusion or objects within an image.

Another known method includes processing image data to identify a number of distinctive features or keypoints in an image and generating a keypoint descriptor, which characterises a region or patch around the keypoint. Colour information for an image may also be used.

Known methods may require significant data processing requirements. Moreover, known techniques of retrieving images focus more on identifying images which are identical to an input image. It is desirable to provide an improved image processing method so that images which are more or less similar to an input image may be identified effectively.

SUMMARY

In accordance with a first aspect, there is provided a method of generating a descriptor of at least part of an image, including: a) receiving image data representing said at least part of the image; b) processing said image data to identify at least one texture characteristic of the at least part of the image, thereby generating texture data indicative of a texture of the at least part of the image; c) processing said texture data with said image data, thereby generating weighted texture data; and d) generating a descriptor of said at least part of said image using the weighted texture data.

This method generates a descriptor for at least part of an image, which descriptor represents information relating to the texture of the at least part of an image, weighted by the image data itself. By weighting the texture data with the image data, differences in the texture are amplified. Therefore, for example in the descriptor, regions of the at least part of the image with a strong or dark texture may be differentiated from other regions with a weaker or lighter texture. In this way, the texture of the at least part of the image can be accurately characterised, given the descriptor holds more texture information.

A descriptor generated according to this method allows similar image parts to be identified more accurately in comparison with known methods which focus on identifying exact image matches. With known methods of image processing, image regions will be identified as being a poor match unless they are identical or almost identical, meaning that parts of images which are similar but not exactly the same will be given a low match rating, indicating that the image parts are different. In contrast, use of the descriptor generated according to the present method will generate a higher match rating for two similar image parts than would be generated using known descriptors, allowing regions which are similar but not identical to be more accurately determined and identified.

A descriptor generated according to this method may be stored in a database and then used for image matching. As described above, the descriptor accurately captures information of the at least part of the image, including its texture. Hence, comparing descriptors of this type for two different image parts allows similar image parts to be matched. For example, this method may be used to retrieve images of clothing from a database which would be recognised or perceived as being visually similar to an input image by a human observer by comparing descriptors for at least part of the images of the clothing.

References to the term 'texture' herein relate to the visual perception of any image and are not limited to images comprising distinctive features such as repeating or regular features. In other words, images without a repeating series of image features, as well as images which do not have a regular arrangement of image features, will also have a texture; indeed, all images have a texture as defined herein. Therefore, images with no distinguishing image features, such as for example a completely black image, in which the intensity of each pixel is equal, will still have a texture; the texture of such an image would be a uniform, plain texture. In some examples, an image texture may be representative of a pattern or a design in an image, for example a logo or artwork.

In some examples, said processing in c) includes weighting said texture data with data indicative of an intensity of the at least part of the image, said weighted texture data being texture intensity data indicative of an intensity of at least one texture characteristic. By combining texture data with intensity data, both the nature of the texture in the at least part of the image as well as the absolute intensity of the texture can be captured in the descriptor. This allows a descriptor for accurate finding of similar images, for example as perceived by a human viewer, in terms of both texture and intensity, to be generated.

In further examples, said image data includes data indicative of one or more colour channels of the at least part of the image, said processing in b) including generating colour channel image data for each of said one or more colour channels, and processing said colour channel image data to identify at least one texture characteristic of the at least part of the image for each of said one or more colour channels, thereby generating said texture data for each of said one or more colour channels. According to these examples, the descriptor captures information regarding the colour of the at least part of the image and the contribution of each colour channel to the texture of the at least part of the image. It is noted that the phrase "one or more colour channels" may apply to all colour channels of an image, or to a subset of all colour channels of an image. Each of said one or more colour channels may correspond with each colour channel of a predetermined colour space, the colour space optionally being CIELAB (the L*a*b* colour space specified by the International Commission on Illumination, CIE, where L* represents the lightness of the colour, a* represents the position of the colour between red/magenta and green and b* represents the position of the colour between yellow and blue), RGB (red, green, blue), YUV (where Y represents the luma of the colour, U represents the difference between the blue component of the colour and the luma and V represents the difference between the red component of the colour and the luma), HSI (hue, saturation, intensity), HSV (hue, saturation, value) and normalised RGB (in which the red, green and blue values are normalised by the sum of the RGB values over all three channels). When the at least part of the image is converted to CIELAB opponent colour channels, the descriptor mimics the human brain's perception of colour. This allows images which a human would find more perceptually similar to be identified.

In some examples, said processing in c) includes processing said texture data for each one of said one or more colour channels with the colour channel image data for the corresponding one of said one or more colour channels, thereby generating weighted texture data for each of said one or more colour channels.

Said processing in c) may also include weighting said texture data of each one of said one or more colour channels with data indicative of an intensity of the at least part of the image for the corresponding one of said one or more colour channels, said weighted texture data being texture intensity data indicative of an intensity of the at least one texture characteristic for each of said one or more colour channels. The combination of texture data with intensity data for each of one or more colour channels provides additional information to the descriptor to better characterise the at least part of the image. Furthermore, weighting the texture data with the intensity data for each of the one or more colour channels allows the absolute contribution of each colour channel to be incorporated into the descriptor, allowing images with similar textures but different colours or different colour intensities to be identified as being visually different.

As described above, descriptors generated using the present method to compare two image parts show improved performance for identifying similar image parts compared to known methods for image processing. With the incorporation of information regarding texture, intensity and colour, the present descriptors more accurately represent the at least part of the image, allowing similar image parts to be more effectively identified.

In examples, generating said descriptor includes generating a histogram of the weighted texture data for each of said one or more colour channels. In examples wherein said descriptor includes a vector for each of said one or more colour channels, each said vector may comprise bin values of said histogram for the corresponding one of said one or more colour channels.

In other examples, said processing in b) includes applying one or more filters to said image data to identify at least one texture characteristic. For example, said one or more filters may include a first direction filter for identifying a texture characteristic of a first direction.

In some examples, said one or more filters includes a set of first direction filters including said first direction filter and at least one further first direction filter for identifying a texture characteristic of the first direction on at least one different scale and/or with at least one different symmetry. In this way, features with the same direction but at different scales (smaller or larger, for example) or different symmetries (for example, rotated with respect to an initial direction) can be identified. By generating texture data at a multitude of different scales, and symmetries (for example, even or odd), a descriptor may be generated which is invariant to changes in scale and symmetry. This allows textures which are identical except for differences in scale or symmetry, which would be identified as being similar by the human visual system, to be identified as similar using the generated descriptors. In some examples, use of the generated descriptor allows image parts with similarities which may not be clearly perceptible to the human observer to be identified as similar.

In further examples, said one or more filters includes a plurality of sets of direction filters, including said set of first direction filters and at least one further set of direction filters for identifying a texture characteristic of at least one further, different, direction optionally with at least one different scale and/or at least one different symmetry. According to this example features at different directions, scales and symmetries may be identified, further improving the performance of the descriptor with respect to identifying perceptually similar images.

In an example, said one or more filters includes four sets of direction filters, each set being for identifying a texture characteristic of a different direction, each set including eight direction filters for identifying a texture characteristic of a predetermined direction, said eight direction filters including four direction filters with different scales and having a first symmetry, and four direction filters with said different scales and having a second symmetry opposite said first symmetry. This combination of filters has been found to give an effective performance, providing a good granularity for identifying image features without being too computationally intensive. Using these filters provides enough texture information to obtain good results when using the generated descriptors to find similar images without being too burdensome computationally.

In some examples, said generating of said descriptor includes generating a histogram of the weighted texture data for each direction, scale and symmetry of said direction filters. Said descriptor may include a vector for each said histogram, said vector comprising bin values of said histogram.

According to some examples, said texture data includes positive texture data representing positive values generated from said processing in b), and negative texture data representing negative values generated from said processing in b). Said generating of the descriptor may also include generating a histogram of the weighted texture data for each direction, scale and symmetry of said direction filters, for said positive texture data, and generating a different histogram of the weighted texture data for each direction, scale and symmetry of said direction filters, for said negative data. Descriptors generated according to these examples may include a vector for each said histogram for the positive texture data and a vector for each said histogram for the negative texture data. Separating positive and negative texture data in this way allows the polarity of the original texture of the at least part of the image to be preserved. This allows image textures with light foregrounds on dark backgrounds to be distinguished from image textures with dark foregrounds on light backgrounds.

In further examples according to the examples above, in b) each of a plurality of pixels of said image data may be processed to identify at least one texture characteristic of each said pixel, the texture data being indicative of a texture of each said pixel, the weighted texture data generated in c) including weighted texture data for each said pixel.

Further examples relate to a method of comparing images, including: processing a descriptor for at least part of an input image and a descriptor for at least one candidate image to generate a match metric indicative of a similarity of the input image and the at least one candidate image, said descriptors having been generated according to a method described herein.

For example, a method such as this may be used to query a database of candidate images to determine which candidate images are similar to an input image, i.e. a query image. The candidate images may be images of clothing, and the method may be used to find images of clothing within a database which are similar to an input image of an item of clothing. As will be apparent to the skilled person, the method may also be used to find similar images for any other type of image, for example, images of accessories, wall paper or soft furnishings. In other examples, the method may be used for medical images obtained from magnetic resonance imaging (MRI) scanners or computerised tomography (CT) scanners, or images obtained from microscopy, for example to identify one or more candidate images similar to an input image. The method may also be used, in further examples, for multi-spectral images for example from satellite imaging.

In a further aspect, there is provided apparatus for generating a descriptor of at least part of an image, the apparatus comprising at least one processor; and at least one memory including computer program instructions, the at least one memory and the computer program instructions being configured to, with the at least one processor, cause the apparatus to perform a method according to a method described herein.

In another aspect, there is provided computer software for generating a descriptor of at least part of an image, the computer software being adapted to perform a method according to a method described herein.

Further features of examples will become apparent from the following description, given by way of example only, which is made with reference to the accompanying drawings.

DETAILED DESCRIPTION OF CERTAIN INVENTIVE EMBODIMENTS

Examples described herein provide a method of generating a descriptor of at least part of an image. The method may be applied to part of an image, i.e. an image region or patch, or to a whole image. The generated descriptor may be used to find similar images.

To put in context examples to be described later, an overview of a use of the descriptor will first be provided, with reference to FIG. 1.

Figure 1:
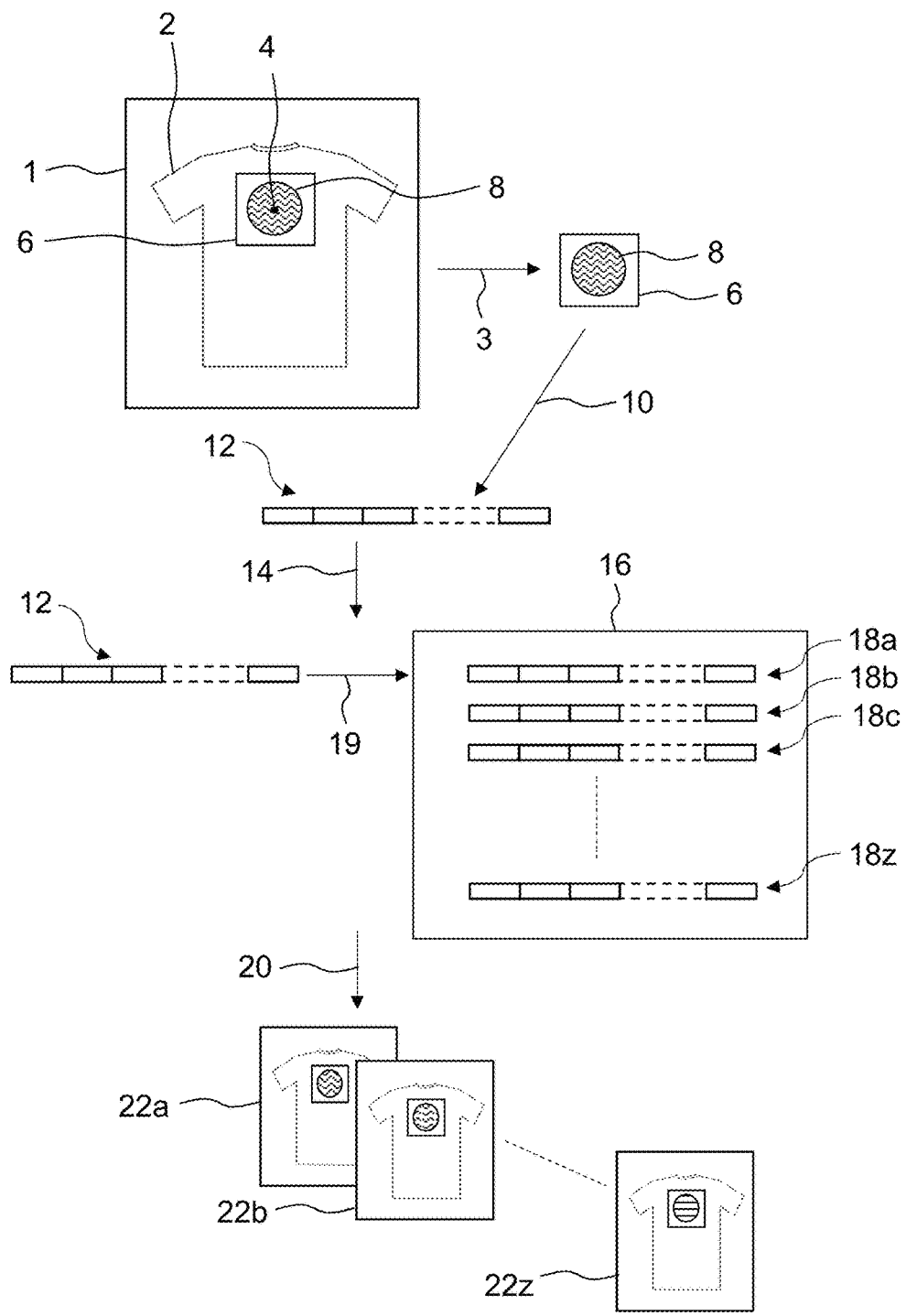
FIG. 1 shows schematically an example of using a descriptor of examples herein to identify similar image patches.

In the example of FIG. 1, a user takes with a camera an image 1 of an item of clothing, in this example a t-shirt 2, which they like the design of. The image 1 of the t-shirt 2 is processed 3, as will later be described, to identify a point of interest 4, which represents a distinctive feature of the t-shirt. An image patch 6 surrounding the point of interest 4 is identified, which, in this example, contains a circular patterned design 8.

The image patch 6 is then processed 10 according to the method to generate a descriptor 12 of the image patch 6, which will be described later. The descriptor 12 of the t-shirt image patch 6 is then processed 14 to identify other similar image patches. In the example of FIG. 1, a database 16 comprising data indicative of a plurality of candidate descriptors 18a to 18z of other image patches is queried 19 to determine the degree of similarity between the t-shirt image patch descriptor 12 and the candidate image patch descriptors 18a to 18z. The candidate image patch descriptors 18a to 18z are then ranked in order of similarity to the t-shirt image patch descriptor 12, from the most similar to the least similar.

Then, image data for each image associated with a candidate image patch descriptor 18a to 18z is returned 20 to the user, from the image 22a comprising the candidate image patch descriptor 18a which was determined to be most similar to the t-shirt image patch descriptor 6 to the image 22z comprising the candidate image patch descriptor 18z which was determined to be least similar to the t-shirt image patch descriptor 6. In other examples, only images which have a certain degree of similarity or higher may be returned to the user.

The user can then use this list of most similar to least similar images however they wish. For example, the user may be trying to find other items by a certain or alternative designer which all have a similar logo or a similar pattern. By using this method, the user can provide an image of an item of apparel of interest, which image is then processed to return a ranked list of images of similar items of apparel to the user, which he/she can purchase for example.

An overview of the method of generating a descriptor will now be given, with reference to FIG. 2, which is a flow diagram indicating the steps of the method 24. This will be followed by a description of the steps in greater detail, according to examples.

Overview of Method

Figure 2:
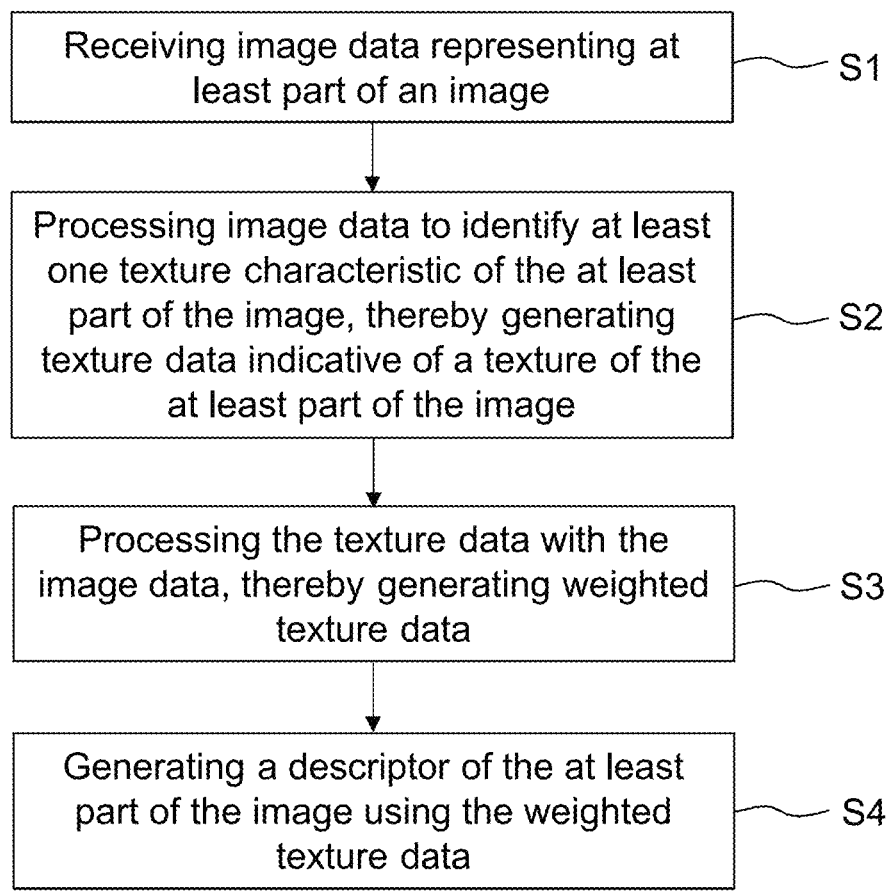
FIG. 2 shows a flow diagram giving an overview of the method according to examples.

In step S1 of the method 24 of FIG. 2, which corresponds with step a) above, image data representing at least part of an image is received.

Next, in step S2, which corresponds with step b) above, the image data received in step S1 is processed to identify at least one texture characteristic of the at least part of the image, thereby generating texture data indicative of a texture of the at least part of the image.

Then, in step S3, which corresponds with step c) above, the texture data generated in step S2 is processed with the image data, thereby generating weighted texture data.

Then, in step S4, which corresponds with step d) above, a descriptor of the at least part of the image is generated using the weighted texture data.

The method of generating a descriptor will now be described in more detail. The method to be described first below relates to an example in which the at least part of the image comprises one colour channel. However, in other examples the at least part of the image comprises more than one colour channel. In such examples, the image data may include data indicative of one or more colour channels of the at least part of the image. These examples are described in more detail later.

Receiving Image Data

As described above with reference to FIG. 1, step S1 of the example method 24 includes receiving image data representing at least part of an image. In some examples, the image data received may represent the entire image; in other examples, the image data received may represent a part of an image, for example, a part around a point of interest in an image. The image data is indicative of at least one characteristic of the at least part of the image, for example an intensity of each of a plurality of pixels. Thus, the image data is indicative of a count of pixels having a particular intensity, for example. The image data may be received by a computing device from a camera device or from a memory by a processor, for example.

A point of interest in an image may be a keypoint, which is a distinctive location in an image that can be robustly localised from a range of viewpoints, rotations, scales, and illuminations for example. For example, keypoints may be generated using the technique described in the reference A. A. Bharath, N. Kingsbury, "Phase Invariant Keypoint Detection", 15$^{th}$ International Conference on Digital Signal Processing, DSP 2007, the contents of which is incorporated herein by reference.

Alternatively, points of interest in an image may be found using biologically-inspired non-linear orientation channels, as described in the reference A. A. Bharath and J. Ng, "A Steerable Complex Wavelet Construction and Its Application to Image Denoising", IEEE Transactions on Image Processing, Vol. 14, No. 7, July 2005, the contents of which is incorporated herein.

In some examples, the at least part of the image around a point of interest in the image may be of a fixed size, for example 32 by 32 pixels. Alternatively, image patches may be chosen at a range of scales, for example patches of size $(32 \times 32) \times 2^S$, where S is the scale. The at least part of the image or image patch does not have to be square in shape; it may be any shape, for example, rectangular or circular.

The identification of a point of interest is shown in an example in FIG. 1, in which a keypoint 4 which corresponds with the central point of a circular patterned design 8 forming part of an image 1 of a t-shirt is selected. An image patch 6 representing at least part of the image 1 is then selected for use in step S2 of the method.

Generating Texture Data

Once image data representing at least part of an image has been received in step S1, step S2 of the method 24 is performed. Step S2 includes processing image data to identify at least one texture characteristic of the at least part of the image, thereby generating texture data indicative of a texture of the at least part of the image.

In an example, processing the image data to identify at least one texture characteristic of the at least part of the image includes applying one or more filters to the image data to identify the at least one texture characteristic. By applying one or more filters to the image data, features within the at least part of the image may be identified. Such features may include, for example, lines, edges or boundaries between light and dark regions of the image. Identifying features within the at least part of the image allows the texture of the at least part of the image to be determined. However, as explained above, if no features are identified, for example if the image is monochromatic with each pixel intensity being the same, the image will still have a texture, albeit a smooth and uniform texture. Regardless of the image features or lack thereof, the texture in this example is the output of the one or more filters applied to the image data.

The one or more filters may include a first direction, i.e. orientation, filter for identifying a texture characteristic of a first direction in some examples. If the filter is a first direction filter, the filter may allow features in the first direction to be determined. For example, use of a filter such as the Sobel operator, which contains approximations of the derivative of the image in the horizontal direction, allows vertical structures, for example vertical lines, within an image to be picked out. In some examples, the first direction may represent an orientation.

In another example, the one or more filters includes a set of first direction filters including a first direction filter and at least one further first direction filter for identifying a texture characteristic of the first direction on at least one different scale and/or with at least one different symmetry. In a further example, the one or more filters includes a plurality of sets of direction filters, including the set of first direction filters and at least one further set of direction filters for identifying a texture characteristic of at least one further, different, direction optionally with at least one different scale and/or at least one different symmetry.

In a particular example, the one or more filters includes four sets of direction filters, each set being for identifying a texture characteristic of a different direction, each set including eight direction filters for identifying a texture characteristic of a predetermined direction, the eight direction filters including four direction filters with different scales and having a first symmetry, and four directions with the different scales and having a second symmetry opposite the first symmetry. This example is illustrated schematically in FIG. 3, as will now be explained.

Figure 3:
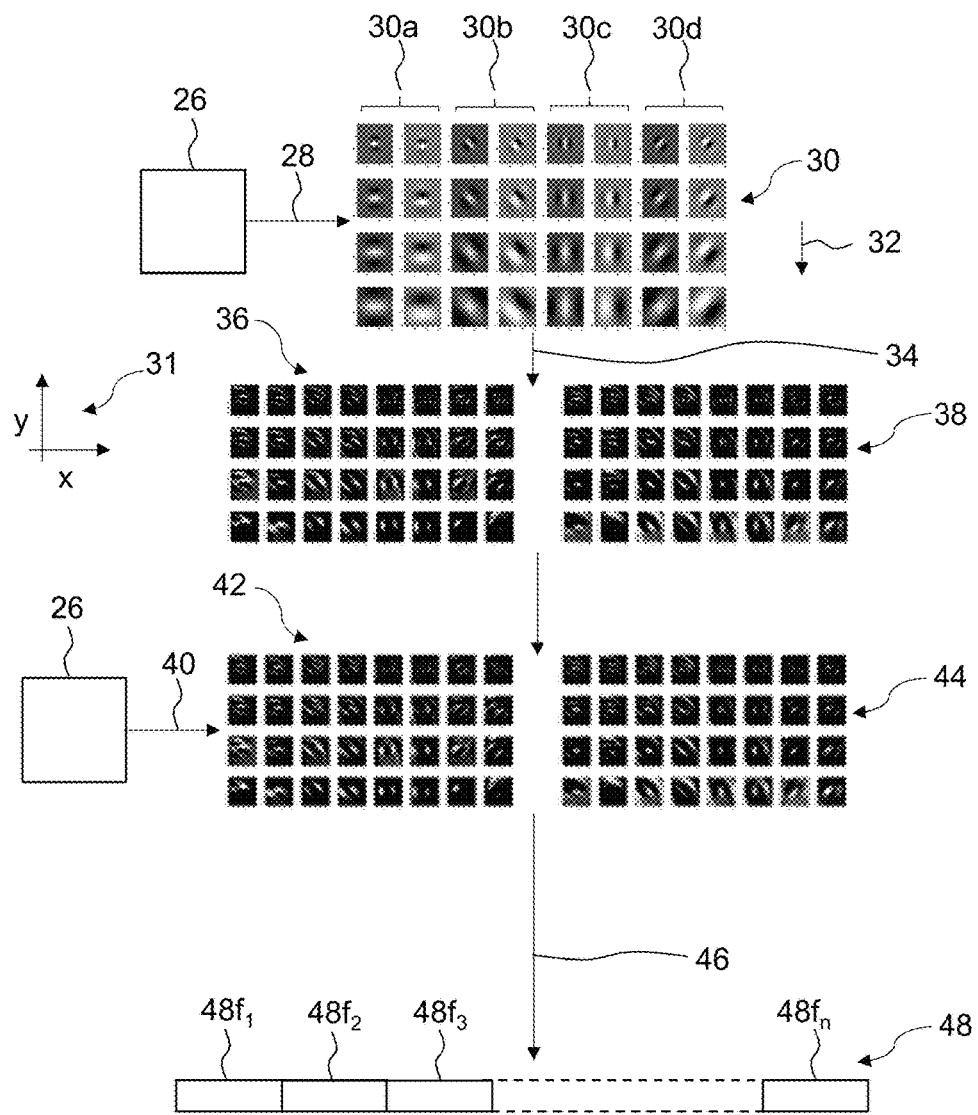
FIG. 3 shows schematically processing in b) of the method according to examples.

In FIG. 3, image data 26 representing at least part of an image, such as an image patch which is for example selected by identifying a keypoint, is processed 28 by convolving the image data 26 with a plurality of filters 30 to generate texture data indicative of a texture of the at least part of the image.

The filters 30 may be of the form of kernels or matrices. In an example, the image data 26 comprises data representing the pixel intensity for each pixel within the at least part of the image or image patch. The image data 26 may be in the form of a matrix, with each component of the matrix representing one pixel. In other examples, each component of the image data 26 matrix may represent more than one pixel.

In an example in which both a filter and the image data 26 are in the form of matrices and each component of the image data 26 matrix corresponds to one pixel, the process of convolving the filter with the image data 26 involves aligning the central component of the filter kernel with each pixel within the image patch, multiplying each component of the kernel with the corresponding component of the image data 26 matrix, and adding the results to give one output value for each pixel. This output value is the texture data for a pixel which is indicative of a texture of the pixel. By applying this method to all the pixels within the image patch, the texture data indicative of a texture of the at least part of the image is generated. In this example, the texture data is a plurality of matrices, each matrix with dimensions equal to the dimensions of the image data 26 matrix. One texture data matrix is generated for each filter. In this example there are 32 filters 30, therefore there are 32 generated texture data matrices. For example, if the image patch size is M pixels by N pixels, the dimensions of the texture data matrix will be M×N. In an example in which there are F filters, there will be F texture data matrices, each with dimensions M×N.

In the example of FIG. 3, four sets of eight direction filters 30 are convolved 28 with the image data 26. Each set of eight direction filters is shown in four lots of columns 30a, 30b, 30c, 30d in FIG. 3. Each filter of one set of filters has the same direction but is at a different one of four different scales and, for each scale, at each of two different symmetries. For example, one filter may have a symmetry corresponding to an orientation of 0 degrees, and the other filter may have a symmetry corresponding to an orientation of 90 degrees. For example, the left and right hand columns in the first lot of columns 30a correspond with filters at the same direction but with opposite symmetries. Each row of texture data, from the top to the bottom row, is obtained with a filter with a larger scale than the previous row; a direction of increasing scale is shown with an arrow 32 in FIG. 3. Each lot of columns 30a to 30d corresponds to a different direction of filter, each differing by 45 degrees, from 0 degrees to 135 degrees.

Use of filters at a plurality of directions, scales and symmetries allows different texture features to be identified within the image patch. Thus, the texture of the image patch may thereby be determined. As previously described, the filters will provide output data indicative of texture regardless of the presence or absence of visually or otherwise identifiable structures or features.

As described above, the texture data is obtained by convolving the filters 30 on a pixel-by-pixel basis with the image data 26 to generate texture data for each pixel for each filter. For example, if the image patch 26 in FIG. 3 has dimensions 32×32 (in other words, if the image patch 26 has 32 pixels in the x-direction and 32 pixels in the y-direction, with the x-direction and y-direction as indicated on the axes 31 illustrated in FIG. 3), the texture data may be represented by 32 matrices because there is a total of 32 filters 30 in this example, each matrix having dimensions of 32×32 corresponding with the image patch dimensions.

The texture data obtained by the convolution of the filters 30 with the image data 26 may be positive (greater than zero) or negative (less than zero) depending on the texture of the image patch with respect to the filter itself. For example, for a pixel which is close to an edge in an image, the output of a filter may be positive or negative depending on which side of the edge it is. The sign of the texture data therefore provides additional information regarding the polarity of the orientation of the structure within the image patch. For example, pixels which are in an image region which is changing from light to dark may have a sign which is different from pixels which are in an image region which is changing from dark to light. Hence, in some examples the texture data includes positive texture data representing positive values generated from the processing in step S2 of the example method and negative texture data representing negative values generated from the processing in step S2.

Separation 34 of texture data into positive texture data 36 and negative texture data 38 is also shown in FIG. 3. The separation 34 in this example is done on a pixel-by-pixel basis. If the texture data for a given pixel and filter is positive, the texture data is placed into a positive texture data matrix and if the texture data is negative it is placed into a negative texture data matrix. For a pixel with positive texture data for a given filter, the corresponding matrix entry in the negative texture data matrix may be given an arbitrary or undefined value to distinguish it from those pixels and filters for which the texture data is negative.

Alternatively, the positive texture data 36 and the negative texture data 38 may not be separated 34 but may be kept in the same matrix. Then the positive texture data 36 and the negative texture data 38 may be processed either together or separately in later steps of the example method.

Figure 4:
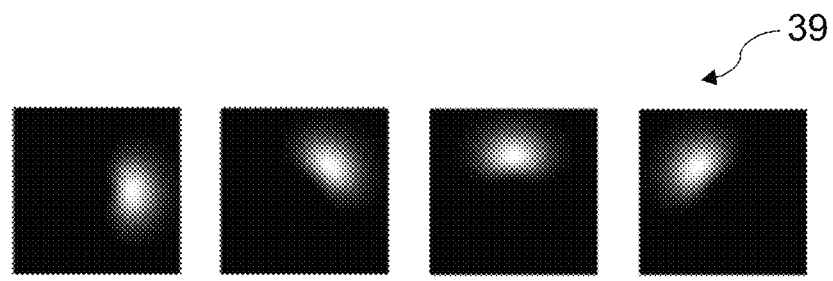
FIG. 4 shows schematically example filters for processing in b) of the method.
Figure 5:
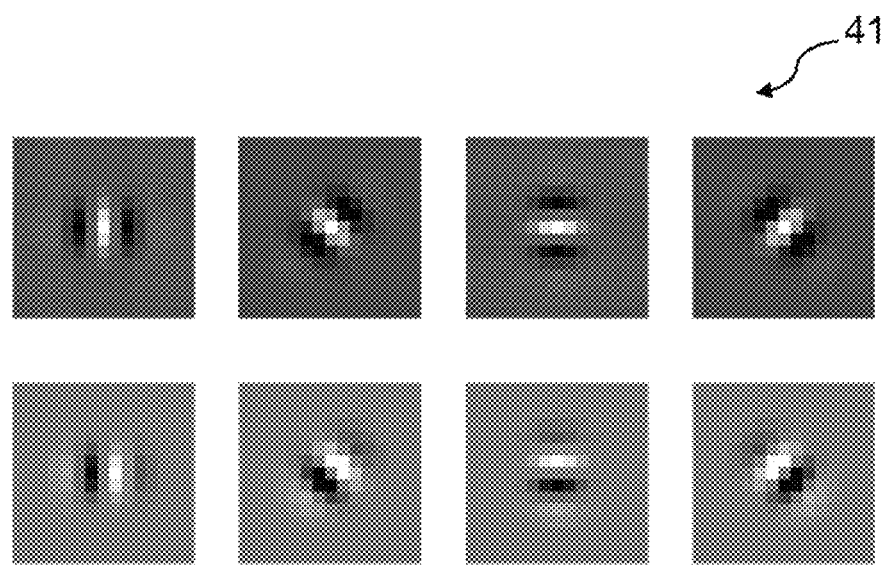
FIG. 5 shows schematically further example filters for processing in b) of the method.

Further example filters 39, 41, which may be used in further examples, are shown in FIGS. 4 and 5, and described in the reference A. A. Bharath and J. Ng, "A Steerable Complex Wavelet Construction and Its Application to Image Denoising", IEEE Transactions on Image Processing, Vol. 14, No. 7, July 2005, the contents of which is included herein by way of reference. For example, the band-pass orientation filters in this reference may be used for the lowest scale filters and the higher scale filters may be created by upscaling the band-pass orientation filters by a factor of 1/sqrt(2).

Generating Weighted Texture Data

After generating texture data indicative of a texture of the at least part of the image in step S2, step S3 of the example method is performed. Step S3 includes processing the texture data with the image data, thereby generating weighted texture data.

An example of this step is shown in FIG. 3. In the example of FIG. 3, positive texture data 36 and negative texture data 38 are each processed 40 with the image data 26 to generate weighted positive texture data 42 and weighted negative texture data 44. In other examples, the texture data is not divided into positive texture data 36 and negative texture data 38 and the texture data, regardless of sign, is weighted by the image data 26 to generate weighted texture data.

In an example, the processing in step S3 includes weighting the texture data with data indicative of an intensity of the at least part of the image, the weighted texture data being texture intensity data indicative of an intensity of at least one texture characteristic. By weighting the texture data with intensity data, information regarding both the texture of the at least part of the image as well as its intensity, for example its strength or precise shade, can be captured.

In further examples, as described earlier, in step S2 each of a plurality of pixels of the image data is processed to identify at least one texture characteristic of each pixel, the texture data being indicative of a texture of each pixel, the weighted texture data generated in step S3 including weighted texture data for each pixel. According to this example, the intensity of each pixel of the at least part of the image is multiplied by the texture data for the corresponding one of each pixel for each filter to obtain the weighted texture data. The weighted texture data in this example may comprise F sets of M×N matrices, where F is the number of filters and the at least part of the image is M by N pixels in size. In a further example where the texture data is separated into positive texture data and negative texture data, there may be two lots of F sets of M×N matrices, one for positive texture data and one for negative texture data.

In these examples, the plurality of pixels processed in step S2 may be all of the pixels within the at least part of the image. Alternatively, the plurality of pixels may be a subset of pixels within the image part.

In other examples, a different statistical aggregation function may be used to process the texture data with the image data instead of a simple weighting. For example, a mean or covariance function may be used to combine the texture data with the image data to obtain weighted texture data. In some examples, image data from a plurality of pixels may be used to process the texture data to generate each piece of weighted texture data. The image data from a plurality of pixels may be image intensity data.

In further examples, the image data is weighted with the texture data to generate the weighted texture data.

Generating a Descriptor

Step S4 of the method 24 shown in FIG. 2 includes generating a descriptor of the at least part of the image using the weighted texture data generated in step S3.

Where the example method 24 includes applying one or more filters to the image data to identify at least one texture characteristic, the generating of the descriptor may include generating a histogram of the weighted texture data for each direction, scale and symmetry of the direction filters.

As described earlier, the weighted texture data may be in the form of F sets of M×N dimensional matrices, one matrix for each filter, with each element of the matrix corresponding to the value of the weighted texture data for a pixel for a given filter. If the weighted texture data is of this form, each bin of the histogram may correspond to a different range of values of weighted texture, and the bin value for each bin may correspond to the number of pixels within the range of values of weighted texture for that bin. Thus, according to this example, there would be F histograms, with the total bin content for each histogram equal to M×N (so that the total bin content for one histogram is equal to the number of pixels in the at least part of the image).

Figure 6:
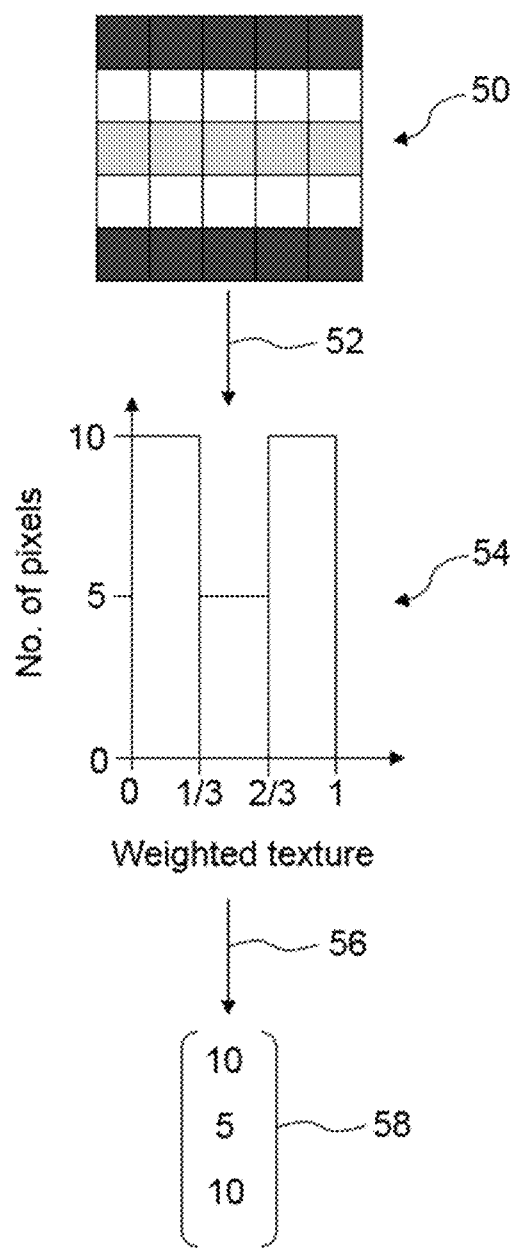
FIG. 6 shows schematically an example of generating a histogram and a descriptor vector from weighted texture data.

A simple example of histogram generation from weighted texture data is shown in FIG. 6. The weighted texture data 50 is illustrated in the example of FIG. 6 as corresponding to an image patch with dimensions of 5 pixels by 5 pixels, and comprising 10 pixels with a weighted texture value of zero (shown in white), 5 pixels with a weighted texture value of 0.5 (shown in light grey) and 10 pixels with a weighted texture value of 1 (shown in dark grey). The weighted texture data 50 is converted 52 into a histogram 54 of weighted texture data as shown. A vector 58 is then generated 56 from the weighted texture data histogram 54, with the first component of the vector 58 having the value of the first bin of the histogram 54 (10), the second component of the vector 58 having the value of the second bin of the histogram 54 (5) and so on.

In the present example, generating the descriptor includes generating a separate histogram of the weighted texture data for each direction, scale and symmetry of the direction filters, for the positive texture data, and generating a different separate histogram of the weighted texture data for each different direction, scale and symmetry of the direction filters, for the negative texture data. Examples such as these may also include generating a descriptor including a vector for each histogram for the positive texture data and a vector for each histogram for the negative texture data. By processing the positive and negative texture data separately, information regarding the polarity of the image is preserved. Therefore, using descriptors generated according to this method, image textures with a dark foreground on a light background can be distinguished from image textures with a light foreground on dark background.

An example of the generation 46 of a descriptor 48 from weighted positive texture data 42 and weighted negative texture data 44 is shown in FIG. 3. In the example of FIG. 3, the descriptor 48 comprises a plurality of descriptor vectors $48f_1$ to $48f_n$, each corresponding with an output of a filter, where n is the total number of filters 30. In the example shown in FIG. 3, there are 32 filters 30, therefore there are 32 descriptor vectors, $48f_1$ to $48f_{32}$.

In further examples in which a histogram of the weighted texture data is generated for each different symmetry of a direction filter, the histograms from different symmetries may be summed to create a quasi-shift invariant histogram. Then, a quasi-shift invariant vector may be generated from the bin content of the summed histogram.

In examples including generating a histogram of the weighted texture data for each direction, scale and symmetry of the direction filters, the descriptor includes a vector representing each histogram, the vector comprising bin values of the histogram. In examples such as that described above, in which F histograms are generated, with one histogram per filter, F vectors may be generated, with each vector comprising the bin values of one of the F histograms. For example, the first component of the vector may correspond to the value of the first bin of the histogram, the second component of the vector may correspond to the value of the second bin of the histogram and so on. The F vectors may be concatenated to form a descriptor vector with the components of the descriptor vector corresponding to the components of the F vectors. The descriptor vector, comprising the F vectors concatenated together, may form the descriptor of the at least part of the image. As described above, this is shown, for example, in FIG. 3, in which the descriptor 48 comprises a plurality of descriptor vectors $48f_1$ to $48f_n$.

In some examples, an image characterised by one or more descriptors may be assigned at least one quantised representative symbol, for example a visual word, corresponding to the one or more descriptors. The generated at least one visual word may be used to identify other similar images, as is well known in the art, by comparing the at least one visual word of an input image with at least one visual word of a candidate image to determine the similarity of the input image and the candidate image. Further details of the visual word technique, are provided by way of reference to the article "Scalable Recognition with a Vocabulary Tree" (2006), David Nistér and Henrik Stewénius, Center for Visualization and Virtual Environments, Department of Computer Science, University of Kentucky, the contents of which is incorporated herein.

Comparing Images Using the Descriptor

Further aspects relate to a method of comparing images, including:

processing a descriptor for at least part of an input image and a descriptor for at least one candidate image to generate a match metric indicative of the similarity of the input image and the at least one candidate image, the descriptors having been generated according to examples described herein.

It will be appreciated that the generated descriptor may be stored in a database. The generated descriptors in the database may then be compared with a descriptor for an input image to determine the similarity of the input image and the images represented by the generated descriptors by calculating a match metric. An example of this is described above, with reference to FIG. 1.

In some examples, the match metric used is the L1 norm. The L1 norm is the sum of the absolute difference between each of the components of the input image descriptor and the candidate image descriptor. In other examples, the match metric is the chi-squared distance between the input and candidate image descriptors. In examples in which the descriptor is in the form of a vector, a comparison is performed between the components of the descriptor vector for the input image and the descriptor vector for the candidate image to generate a match metric.

In further examples, the match metric may be based on a Euclidean distance, as is well known in the art. The Euclidean distance based match metric may be calculated between the input image descriptor and the candidate image descriptor.

The match metric calculated according to the examples above may be thresholded using a threshold value that can for example be set by a user. The threshold value is set for determining the similarity of the input image and the at least one candidate image. For example, if the match metric between the input image descriptor and the candidate image descriptor has a value greater than the threshold, then it may be determined that the input image and the candidate image are similar. The higher the match metric, the more similar the input image and the candidate image are determined to be. If, however, the calculated match metric is lower than the threshold, then the input image is determined to be different from, in other words not similar enough to, the candidate image. If there is more than one candidate image and more than match metric is greater than the threshold, then the greatest match metric may be taken as the closest match, indicating that the input image and the candidate image with the greatest match metric are the most similar.

In other examples, there is no threshold value for determining the similarity of the input image and the at least one candidate image. In these examples, the candidate images may be ranked in terms of similarity with the input image, by ordering the candidate images in terms of match metric from the most similar (with the highest degree of match) to the least similar (with the lowest degree of match). In further examples, the candidate images may be arranged from the least similar to the input image to the most similar.

Using Colour Channels

In examples, the image data includes data indicative of one or more colour channels of the at least part of the image, the processing in step S2 including generating colour channel image data for each of the one or more colour channels, and processing the colour channel image data to identify at least one texture characteristic of the at least part of the image for each of the one or more colour channels, thereby generating the texture data for each of the one or more colour channels. By processing the at least part of the image for each of the colour channels separately, the method of generating the descriptor mimics the human brain's perception of colour, allowing similar image patches, characterised by descriptors generated in this way, to be identified.

In further examples, each of the one or more colour channels corresponds with each colour channel of a predetermined colour space, the colour space optionally being CIELAB, RGB or YUV as described above.

In other examples, the processing in step S3 includes processing the texture data for each one of the one or more colour channels with the colour channel image data for the corresponding one of the one or more colour channels, thereby generating weighted texture data for each of the one or more colour channels. According to the previously described example, if the weighted texture data is formed of F lots of M×N matrices for each colour channel, the weighted texture data will comprise a total of C lots of F lots of M×N matrices, where C is the number of colour channels. For example, if the one or more colour channels correspond with the colour channels of the CIELAB colour space, there will be three colour channels (L*, a* and b*). Therefore, if the image data represents three colour channels in the example of FIG. 3, in which 32 filters 30 are used and the image patch size is 32 by 32 pixels, there will be a total of 96 matrices, each with dimensions of 32 by 32, of weighted texture data (from 3 colour channels for 32 filters 30), 96 histograms (one for each matrix of weighted texture data) and 96 vectors (one for each histogram) generated from the histograms.

In some examples, the processing in step S3 includes weighting the texture data of each one of the one or more colour channels with data indicative of an intensity of the at least part of the image for the corresponding one or the one or more colour channels, the weighted texture data being texture intensity data indicative of an intensity of the at least one texture characteristic for each of the one or more colour channels. In this way, texture and colour information is combined to obtain a descriptor which allows similar image patches to be identified. In particular, the texture intensity data describes not only the relative difference between different points in the image patch, but also the absolute intensity of the texture. In this way, a dark image with the same relative difference between points in the image as a light image, in other words, two images with the same texture but a different intensity or colour, may be distinguished from each other.

In further examples, similar to those described above with reference to examples including applying one or more filters, generating the descriptor includes generating a histogram of the weighted texture data for each of the one or more colour channels. In other examples according to this example, the descriptor includes a vector for each of the one or more colour channels, each vector comprising bin values of the histogram for the corresponding one of the one or more colour channels.

Image Processing Apparatus

Figure 7:
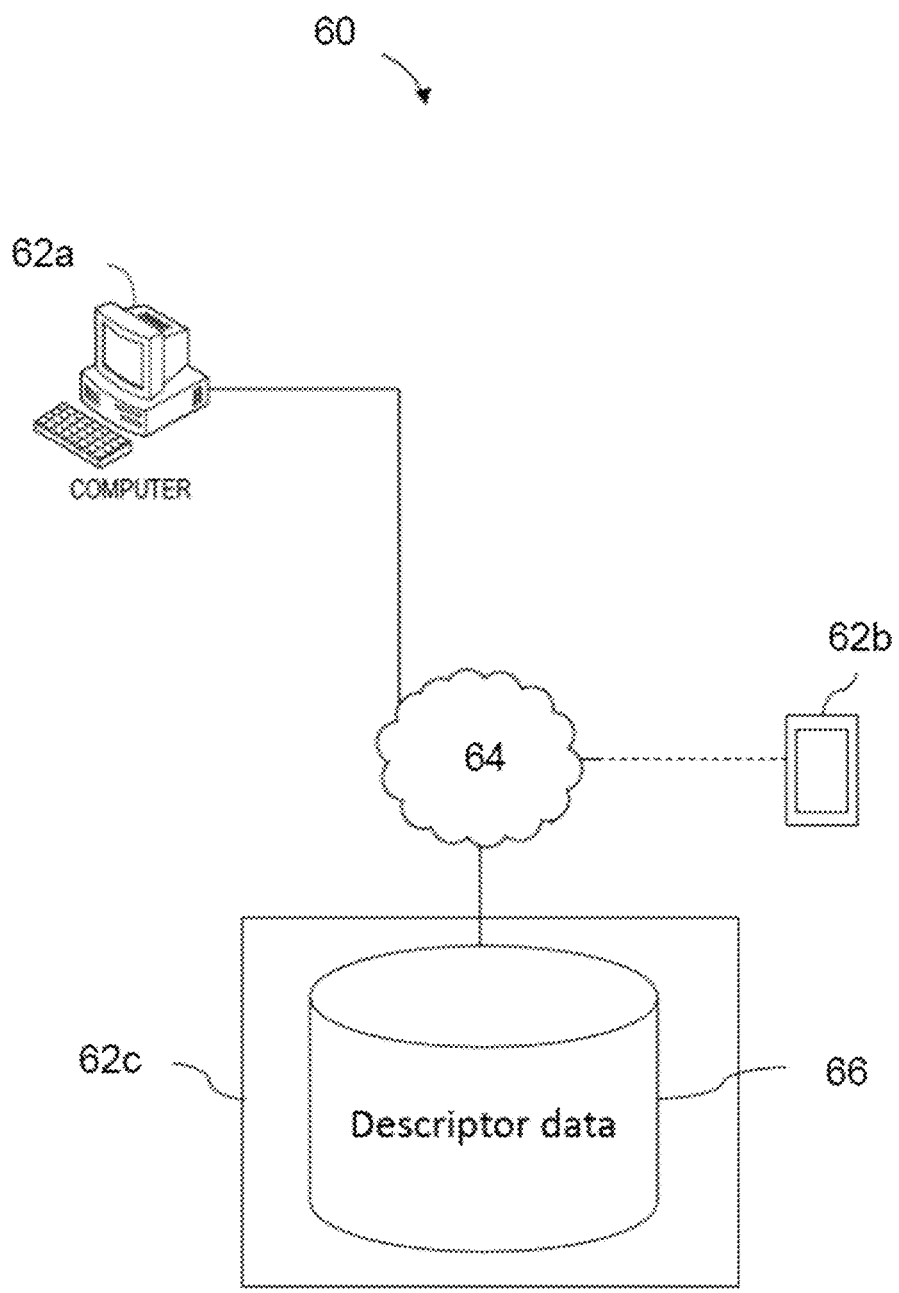
FIG. 7 shows schematically apparatus for performing the method according to an example.

FIG. 7 illustrates schematically one example of apparatus 60 for processing data and performing a method in accordance with examples described herein. The apparatus 60 may include one or more computers 62a-62c. The computers 62a-62c may take various forms such as, for example, any workstation, server, or other computing device capable of processing data. For example, as illustrated in FIG. 7, the computer labelled 62a is a desktop computer (but may be a laptop or tablet computer in other examples), the computer labelled 62b is a mobile computing device such as a mobile telephone like a so called smartphone, and the computer labelled 62c is a server computer. The computers 62a-62c may be connected by a computer network 64. The computer network 64 may be the Internet, a local area network, a wide area network, or some other type of network such as a wireless mobile telecommunications network (indicated with a dashed line in the Figure) in the case of a mobile computing device for example. The computers may communicate over the computer network 64 via any suitable communications technology or protocol. The computers 62a-62c may share data via the computer network 64 by transmitting and receiving data relating to for example computer software, image data and data representing a descriptor of at least part of an image and/or instructions to provide at least part of the method of examples described herein.

The method of generating a descriptor according to examples described herein may be performed by any of the computers 62a-62c. The method of identifying similar images to an input image, by comparing descriptors, in accordance with examples described herein, may be performed by one of computers 62a-62c, or may be performed using more than one computer 62a-62c. For example, image data relating to an input image may be captured by a camera which is part of a smartphone 62b; this image data may be transmitted via the network 64 to the server 62c which receives the image data and queries a database 66 holding data of descriptors for comparison with the input image descriptor, to identify any of the descriptors in the database 66 which are considered similar to the input descriptor. Image data associated with any of the descriptors identified as being sufficiently similar may then be transmitted via the network to the smartphone 62b, for display to a user. In other examples, the descriptor database may be stored by the smartphone 62b or by a desktop computer 62a. In such examples the processing to identify similar descriptors and subsequent display to a user may be performed by a single computing device, such as the desktop computer 62a or the smartphone 62b, without needing to be connected to a computer network; image data for processing may be transmitted to the computer 62a, 62b from a camera. Alternatively, the processing may be done by a computer 62a or 62b which accesses the descriptor data 66 on the server 62c via the network 64 for any comparison of descriptors.

Figure 8:
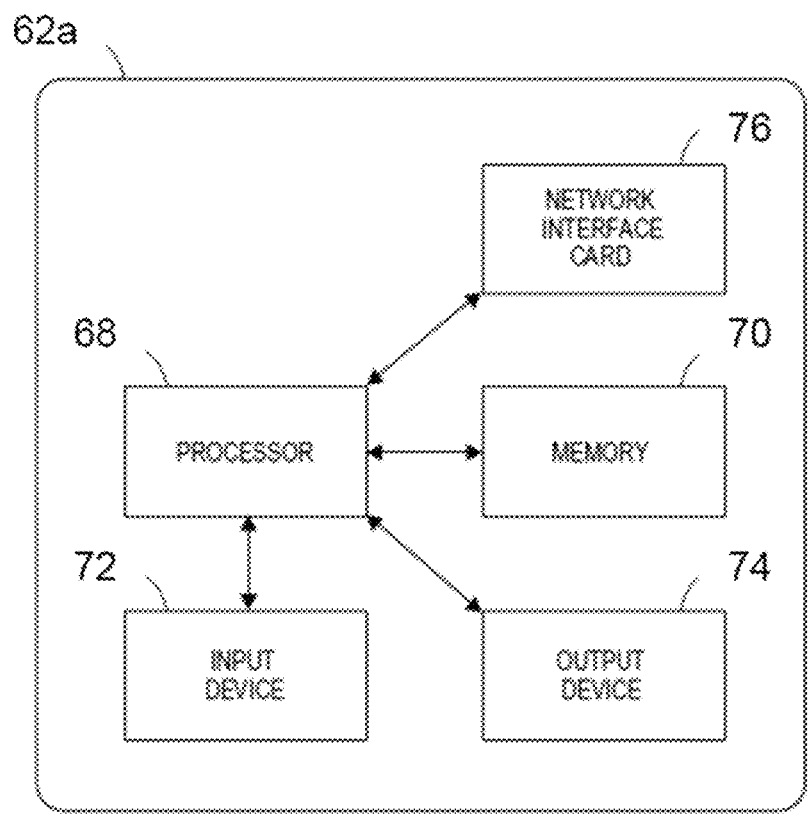
FIG. 8 shows schematically an example of one of the computers of FIG. 7.

FIG. 8 shows schematically an example of one of the computers 62a-62c of FIG. 7, namely the computer labelled 62a. The computer 62a includes a processor 68. The processor 68 is in data communication with various computer components. These components may include a memory 70, an input device 72, and an output device 74. In certain examples, the processor may also communicate with a network interface card 76 for data communication with the network 64. Although described separately, it is to be appreciated that functional blocks described with respect to the computer 62a need not be separate structural elements. For example, the processor 68 and network interface card 76 may be embodied in a single chip or board.

The processor 68 may be a general purpose processor, a digital signal processor (DSP), an application specific integrated circuit (ASIC), a field programmable gate array (FPGA) or other programmable logic device, a discrete gate or transistor logic, discrete hardware components, or any suitable combination thereof designed to perform the functions described herein. A processor may also be implemented as a combination of computing devices, e.g., a combination of a DSP and a microprocessor, a plurality of microprocessors, one or more microprocessors in conjunction with a DSP core, or any other such configuration. The processor 68 may be coupled, via one or more buses, to read information from or write information to the memory 70. The processor may additionally, or in the alternative, contain memory, such as processor registers. The memory 70 may include processor cache, including a multi-level hierarchical cache in which different levels have different capacities and access speeds. The memory 70 may further include random access memory (RAM), other volatile storage devices, or non-volatile storage devices. The memory may include data storage media of such as for example a hard drive, an optical disc, such as a compact disc (CD) or digital video disc (DVD), flash memory, a floppy disc, magnetic tape, solid state memory and Zip drives. The memory may be a non-transitory computer-readable storage medium having computer-readable instructions, i.e. computer software, stored thereon, which when executed cause a computerised device to perform a method according to examples described herein.

The processor 68 may also be coupled to an input device 72 and an output device 74 for, respectively, receiving input from and providing output to a user of the computer 62a. Suitable input devices include, but are not limited to, a keyboard, a rollerball, buttons, keys, switches, a pointing device, a mouse, a joystick, a remote control, an infrared detector, a voice recognition system, a bar code reader, a scanner, a still or video camera (possibly coupled with video processing software to, e.g., detect hand gestures or facial gestures), a motion detector, a microphone (possibly coupled to audio processing software to, e.g., detect voice commands), or other device capable of transmitting information from a user to a computer. The input device may also take the form of a touch screen associated with the display, in which case a user responds to prompts on the display by touching the screen. The user may enter textual information through the input device such as the keyboard or the touch-screen. Suitable output devices include, but are not limited to, visual output devices, including displays and printers, audio output devices, including speakers, headphones, earphones, and alarms, and haptic output devices.

The processor 68 may further be coupled to a network interface card 76. The network interface card 76 is configured to prepare data generated by the processor 68 for transmission via a network according to one or more data transmission protocols, for example the Ethernet protocol. The network interface card 76 may also be configured to decode data received via the network. In some examples, the network interface card 76 may include a transmitter, receiver, or both. Depending on the specific example, the transmitter and receiver can be a single integrated component, or they may be two separate components. The network interface card 76 may be embodied as a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein.

The above examples are understood to be illustrative examples. Further examples are envisaged.

In a further example in which the image data includes data indicative of a plurality of colour channels, the colour channels are not separated. Instead, a descriptor is generated for the combined colour image, without processing each colour channel separately. In this example, the image data used to weight the texture data may comprise intensity data representative of the image brightness or the image hue or colour. In other examples, a selection of all colour channels of an image part are used to generate the descriptor.

The example shown in FIG. 3 illustrates the use of 32 filters 30 to generate the texture data. However, in other examples, more or fewer filters may be used when generating texture data. Moreover, any combination of filters relating to direction, symmetry, scale or any other image feature may be used to generate texture data in examples in which filters are used. For example, texture data may be generated without applying filters at different directions, without applying filters at different symmetries and/or without applying filters at different scales. In some other examples, one or more filters, which may include for example any of the filters 78, 80, 82 shown in FIGS. 9, 10 and 11 respectively, are used in addition to or instead of filters at different directions, symmetries and/or scales.

Figure 9:
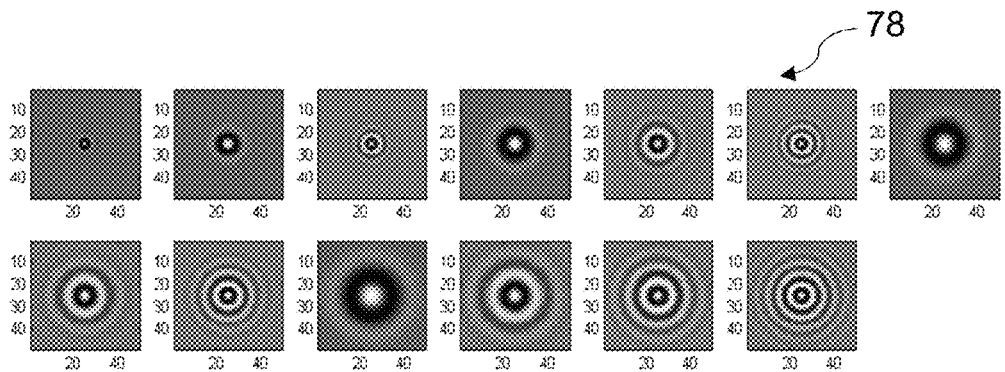
FIGS. 9, 10, 11 and 13 show schematically example filters for processing in b) of the method.

The example filters 78 illustrated in FIG. 9 comprise 13 rotationally invariant isotropic filters, $F(r, \sigma, \tau)$:

$$F(r, \sigma, \tau) = F_0(\sigma, \tau) + \cos\left(\frac{\pi \tau r}{\sigma}\right) e^{-\frac{r^2}{2\sigma^2}}$$

where $F_0$ is the mean value of the filter for a given value of $\sigma$ and $\tau$, $r$ is the pixel location, $\sigma$ is the scale and $\tau$ is the number of cycles of the harmonic function within the Gaussian envelope of the filter. Further details of these example filters are provided by way of reference to "Constructing models for content-based image retrieval", C. Schmid, In Proc. IEEE International Conference on Computer Vision and Pattern Recognition, Vol. 2, pp. 39-45 (2001), the contents of which is incorporated herein by reference. These example filters 78 may be applied to image data representing at least part of an image to generate texture data indicative of a texture of the at least part of the image.

Figure 10:
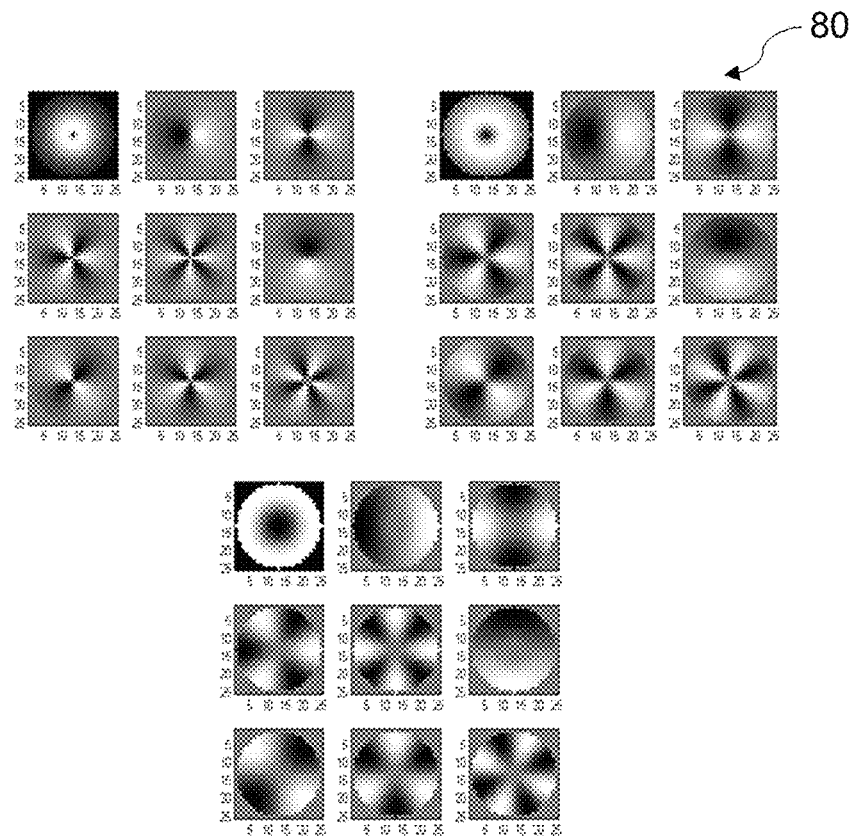
Figure 12:
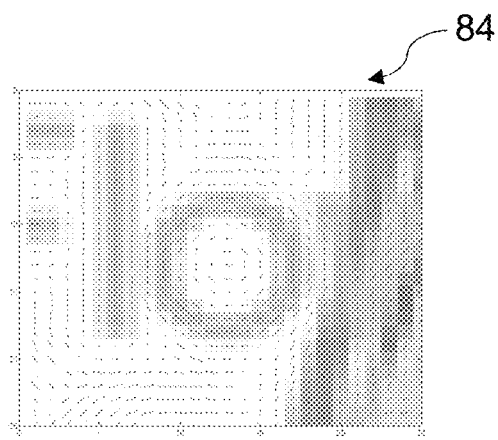
FIG. 12 shows schematically an example orientation field.

FIG. 10 shows an example of spherical harmonic filters 80. In an example, a descriptor may be generated using spherical harmonic filters such as these by projecting an image orientation field representing a flow of directions of image structures, i.e. characteristics, such as the example image orientation field 84 illustrated in FIG. 12, on to the spherical harmonic filters 80. In this example, the image orientation field 84 is an example of image data representing at least part of an image and the data generated by projecting the image orientation field 84 on to the spherical harmonic filters 80 is an example of texture data indicative of a texture of the at least part of the image. The generated texture data may include real and imaginary values, and may in this example be processed with image data representing at least part of the image to generate weighted texture data; a descriptor of the at least part of the image may then be generated using the weighted texture data. The processing of the generated texture data may be performed separately for the real and imaginary texture data in some examples to generate real and imaginary weighted texture data, which may be combined to generate a descriptor.

Figure 11:
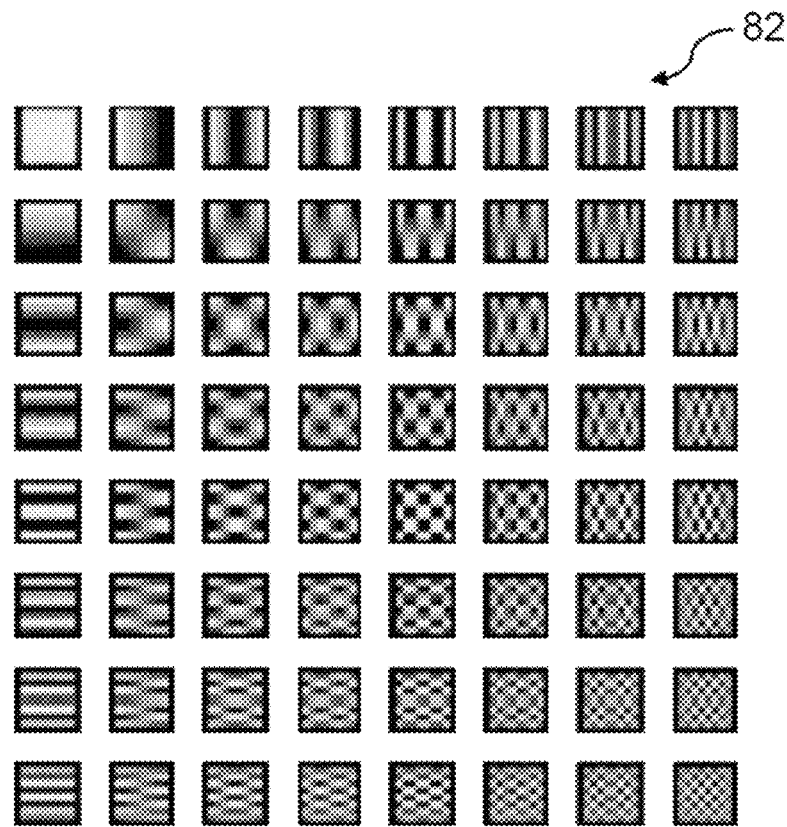

The example filters 82 of FIG. 11 may be used in some examples to generate texture data by applying the example filters 82 to image data representing at least part of an image. The example filters 82 shown in FIG. 11 are discrete cosine transforms, which encode the image in terms of a sum of sinusoids of different frequencies. For an image comprising N by M pixels, the filters 82, F(u, v), according to this example are:

$$F(u, v) = \left(\frac{2}{N}\right)^{\frac{1}{2}}\left(\frac{2}{M}\right)^{\frac{1}{2}} \sum_{i=0}^{N-1} \sum_{j=0}^{M-1} g(i).g(j).\cos\left[\frac{\pi u}{2N}(2i+1)\right]\cos\left[\frac{\pi v}{2M}(2j+1)\right].f(i, j)$$

where f(i,j) is the image intensity at location (i,j), (u,v) represents frequencies in orthogonal directions (for example, horizontal and vertical) and $$g(\varepsilon) = \begin{cases} \frac{1}{\sqrt{2}} & \text{for } \varepsilon = 0 \\ 1 & \text{otherwise} \end{cases}$$

where ε=i or j in this example.

In an example in which filters are used to generate texture data, the filters may be or comprise the Canny edge operator. The Canny edge operator comprises two kernels $M_{gx}$ and $M_{gy}$ where:

$$M_{gx} = \begin{matrix} -1 & 0 & 1 \\ -2 & 0 & 2 \\ -1 & 0 & 1 \end{matrix} \quad M_{gy} = \begin{matrix} 1 & 2 & 1 \\ 0 & 0 & 0 \\ -1 & -2 & -1 \end{matrix}$$

which are convolved with image data to calculate the image intensity gradient for each pixel in the x and y directions respectively, denoted $G_x$ and $G_y$. Two matrices, one containing the value of the gradient magnitude for each pixel and the other containing the edge orientation for each pixel, defined as:

$$\text{Gradient Magnitude} = \sqrt{G_x^2 + G_y^2}$$

$$\text{Edge Orientation} = \arctan(|G_x|/|G_y|)$$

may then be generated. The gradient magnitude and edge orientation matrices are examples of texture data indicative of a texture of the at least part of the image.

Figure 13:
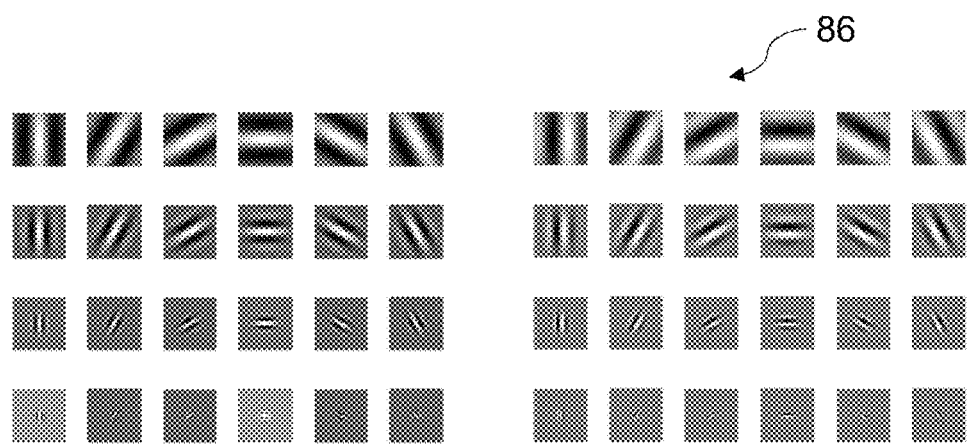

Gabor filters 86, illustrated in FIG. 13, are an example of filters with different orientations, scales and symmetries which may be applied to image data to generate texture data indicative of a texture of at least part of an image in an example.

In some examples, the at least one texture characteristic of the at least part of the image is identified by applying at least one local binary pattern operator to the image data to generate integers representing the texture of the at least part of the image. In alternative examples, at least one local trace transform or local wavelet transform is used to identify the at least one texture characteristic. In further examples, the at least one texture characteristic is identified by applying at least one derivative operator to the image data. In other examples, the image data is compared against a previously learned dictionary of textures to identify the at least one texture characteristic of the at least part of the image.

In some previously described examples, the processing in c) of the method includes weighting texture data with data indicative of an intensity of the at least part of the image, for example by multiplying the intensity of each pixel of the at least part of the image by the texture data for the corresponding pixel for each filter.

In further examples, the processing in c) of the method includes processing the texture data with the image data to generate weighted texture data by, for example, weighting the texture data with data indicative of at least one characteristic of the at least part of the image, derived from the image data. In one example, such derived data is indicative of a number of pixels of a given intensity. The resulting weighted texture data may be represented as a histogram as illustrated in FIG. 14.

Figure 14:
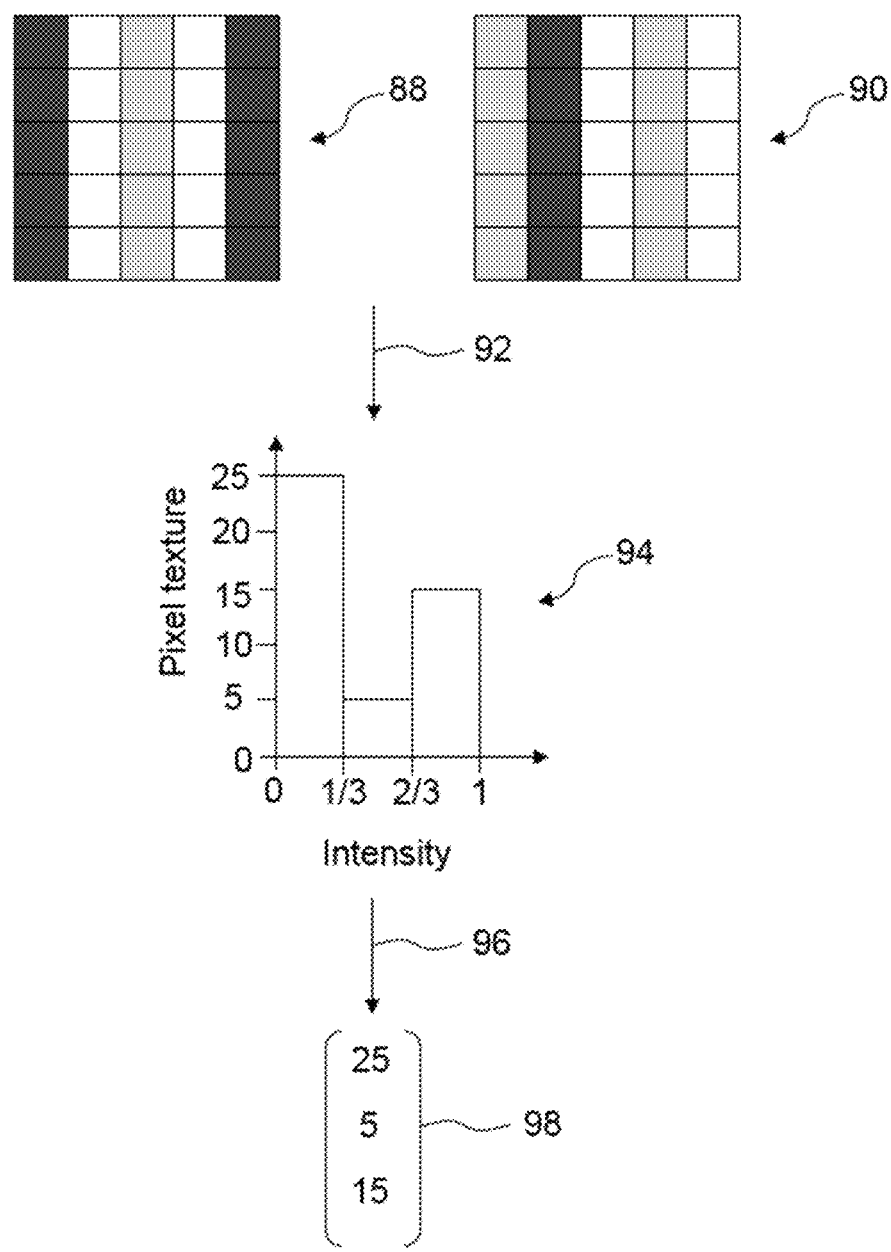
FIG. 14 shows schematically an example of generating a histogram and a descriptor vector from texture data and image data.

In the example now to be described using FIG. 14, texture data 88 and image data 90 corresponding to an image patch with dimensions of 5 pixels by 5 pixels are processed 92 to generate a histogram 94 representing weighted texture data. The image data 90 and the texture data 88 may be in accordance with the image data and texture data in examples described previously, and may correspond to all pixels of the image patch or any combination or subset of the pixels.

In this example, the value of the texture data 88 is 1 for pixels shown in white, 2 for pixels shown in light grey and 3 for pixels shown in dark grey. The value of the image data 90 is 0 for pixels shown in white, 0.5 for pixels shown in light grey and 1 for pixels shown in dark grey. The texture data 88 and the image data 90 are shown separately in FIG. 14 since they are not necessarily the same for each pixel.

The histogram 94 generated by processing 92 the texture data 88 with the image data 90 is an example of a representation of the weighted texture data. The image data includes data of the intensity for each pixel, and therefore is indicative of the number of pixels of a particular pixel intensity, and therefore of the number of pixels within a particular pixel intensity range. In this example, image data of the number of pixels within a particular pixel intensity range is multiplied by the texture data corresponding to those pixels, thereby weighting the texture data for those pixels. In this example, a weighted histogram 94 binned in pixel intensity is generated, with a bin value of a given pixel intensity range corresponding to the number of pixels within this intensity range multiplied by the texture data 88 for those pixels. In other words, each bin of the histogram 94 contains a sum of the pixel texture value for pixels having an intensity corresponding to that bin range. In other examples, each bin may contain a sum of the number of pixels and the pixel texture value for pixels having an intensity corresponding to that bin range.

As will be appreciated by the skilled person, in other examples, the histogram may be binned in other image data values instead of the pixel intensity. Alternatively, the histogram may be binned in texture data, with each bin containing a sum of image data values, for example pixel intensity values, for pixels having a texture data value corresponding to that bin range.

In this example described using FIG. 14, there are 10 pixels with a pixel intensity value of 0 (the third and fifth columns of the image data 90). The sum of the pixel texture values for these pixels is 25 since each of the five pixels in the third column of the texture data 88 has a value of 2, thus giving a combined texture value of 10, and each of the five pixels in the fifth column of the texture data 88 has a value of 3, thus giving a combined texture value of 15. Hence, the bin value for the bin of the histogram 94 corresponding to a pixel intensity value of 0 (i.e. the first bin) is 25, this being the sum of 10 and 15 for the pixels in question. Each bin may be populated in a similar manner.

In further examples comprising generating a histogram using pixel intensities, the pixel intensity value used may, instead of being the exact value of the pixel intensity, be the value of the centre of the histogram bin into which the pixel intensity would fall or may represent a distance value of how close the pixel intensity is to the bin centre value.

In the present example, a descriptor, which in this example is a vector 98, is then generated 96 from the weighted texture data represented by the histogram 94. As described previously with reference to the example of FIG. 6, the first component of the vector 98 has the value of the first bin of the histogram 94 (25), the second component of the vector 98 has the value of the second bin of the histogram 94 (5) and so on.

As described above, texture data may be processed with image data to generate weighted texture data, for example by weighting texture data with intensity data. It is envisaged that the term weighted texture data used herein encompasses examples where weighted texture data may be considered to be generated by weighting texture data with data indicative of at least one characteristic of the at least part of the image, which is derived from the image data and is for example data of an intensity of the at least part of the image.

The above examples illustrate generating a descriptor for an image patch of a fixed size, at a given scale. In other examples, a descriptor may be generated for at least part of an image at a plurality of different scales, or for image patches of a plurality of different sizes. Such descriptors may be combined or treated separately when used to retrieve similar images. It is to be understood that any feature described in relation to any one example may be used alone, or in combination with any feature described, and may also be used in combination with one or more features of any other of the examples, or any combination of any other of the examples. Furthermore, equivalents and modifications not described above may also be employed without departing from the scope of the accompanying claims.

What is claimed is:

1. A method of generating a descriptor of at least part of an image, the method comprising:
   a) receiving image data representing the at least part of the image, wherein the image data includes pixel intensity data indicative of a pixel intensity of pixels of the at least part of the image for one or more color channels;
   b) processing the image data to identify at least one texture characteristic of the at least part of the image, wherein the processing the image data includes applying at least one filter to the image data, and wherein the processing the image data produces texture data indicative of a texture of the at least part of the image;
   c) processing the texture data with at least the pixel intensity data, wherein the processing the texture data includes weighting the texture data with the pixel intensity data for each of the one or more color channels, and wherein the processing the texture data produces texture intensity data indicative of an intensity of at least one texture characteristic for each of the one or more color channels; and subsequently,
   d) generating the descriptor of the at least part of the image using the texture intensity data.

2. The method according to claim 1, the processing in b) including generating color channel image data for each of the one or more color channels, and processing the color channel image data to identify at least one texture characteristic of the at least part of the image for each of the one or more color channels, thereby generating the texture data for each of the one or more color channels.

3. The method according to claim 1, wherein each of the one or more color channels corresponds with, respectively, a color channel of at least one of: a predetermined color space, a CIELAB color space, an RGB color space, a YUV color space, an HSI color space, an HSV color space, or a normalized RGB color space.

4. The method according to claim 1, wherein the generating the descriptor includes generating a histogram of the texture intensity data for each of the one or more color channels.

5. The method according to claim 4, wherein the descriptor includes a vector for each of the one or more color channels, each vector comprising bin values of the histogram for a corresponding one of the one or more color channels.

6. The method according to claim 1, wherein the at least one filter includes a first direction filter for identifying a texture characteristic of a first direction.

7. The method according to claim 6, wherein the at least one filter includes a set of first direction filters including the first direction filter and at least one further first direction filter for identifying a texture characteristic of the first direction on at least one different one of: a scale or a symmetry.

8. The method according to claim 7, wherein the at least one filter includes a plurality of sets of direction filters, including the set of first direction filters and at least one further set of direction filters for identifying a texture characteristic of at least one of:
   a further, different, direction;
   the further, different, direction with at least one different scale; or
   the further, different, direction with at least one different symmetry.

9. The method according to claim 1, wherein the at least one filter includes four sets of direction filters, each one of the four sets of direction filters being for identifying a texture characteristic of a different direction, each one of the four sets of direction filters including eight direction filters for identifying a texture characteristic of a predetermined direction, the eight direction filters including a first set of four direction filters with different scales, respectively, and having a first symmetry, and a second set of four direction filters with the different scales, respectively, and having a second symmetry opposite the first symmetry.

10. The method according to claim 1, wherein the generating the descriptor includes generating a histogram of the texture intensity data for each different direction, scale and symmetry of the at least one filter.

11. The method according to claim 10, wherein the descriptor includes a vector for each histogram, the vector comprising bin values of the histogram.

12. The method according to claim 1, wherein the texture data includes positive texture data representing positive values generated from the processing in b), and negative texture data representing negative values generated from the processing in b).

13. The method according to claim 12, wherein the generating the descriptor includes generating a histogram of the texture intensity data for each direction, scale and symmetry of the at least one filter, for the positive texture data, and generating a different histogram of the texture intensity data for each direction, scale and symmetry of the at least one filter, for the negative texture data.

14. The method according to claim 13, wherein the descriptor includes a first vector for each histogram for the positive texture data and a second vector for each histogram for the negative texture data.

15. The method according claim 1, wherein in b) each of a plurality of the pixels of the at least part of the image are processed to identify at least one texture characteristic of each of the plurality of the pixels, the texture data being indicative of a texture of each pixel of the plurality of the pixels, the texture intensity data generated in c) including texture intensity data for each pixel of the plurality of the pixels.

16. The method according to claim 1, wherein the pixel intensity data is indicative of pixel intensity values, each representative of a respective pixel intensity of a pixel of the pixels, and the texture data is indicative of texture values, each representative of a respective texture of a pixel of the pixels, and the weighting the texture data with the pixel intensity data in c) comprises, for each of the pixels, multiplying one of the pixel intensity values with a corresponding one of the texture values.

17. A method of comparing images, comprising:
processing an input image descriptor for at least part of an input image and a respective candidate image descriptor for at least part of a candidate image to generate a match metric indicative of a similarity of the input image and the candidate image,
the input image descriptor having been generated according to a method including:
a) receiving input image data representing the at least part of the input image, wherein the input image data includes input image pixel intensity data indicative of a pixel intensity of pixels of the at least part of the input image for one or more color channels;
b) processing the input image data to identify at least one input image texture characteristic of the at least part of the input image, wherein the processing the input image data includes applying at least one filter to the input image data, and wherein the processing the input image data produces input image texture data indicative of a texture of the at least part of the input image;
c) processing the input image texture data with at least the input image pixel intensity data, wherein the processing the input image texture data includes weighting the input image texture data with the input image pixel intensity data for each of the one or more color channels, and wherein the processing the input image texture data produces input image texture intensity data indicative of an intensity of at least one texture characteristic for each of the one or more color channels; and, subsequently,
d) generating the input image descriptor of the at least part of the input image using the input image texture intensity data; and
each candidate image descriptor having been generated according to a method including:
a) receiving candidate image data representing the at least part of the candidate image, wherein the candidate image data includes candidate image pixel intensity data indicative of a pixel intensity of pixels of the at least part of the candidate image for the one or more color channels;
b) processing the candidate image data to identify at least one candidate image texture characteristic of the at least part of the candidate image, wherein the processing the candidate image data includes applying at least one filter to the candidate image data, and wherein the processing the candidate image data produces candidate image texture data indicative of a texture of the at least part of the candidate image;
c) processing the candidate image texture data with at least the candidate image pixel intensity data, wherein the processing the candidate image texture data includes weighting the candidate image texture data with the candidate image pixel intensity data for each of the one or more color channels, and wherein the processing the candidate image texture data produces candidate image texture intensity data indicative of an intensity of at least one texture characteristic for each of the one or more color channels; and
d) generating the candidate image descriptor of the at least part of the candidate image using the candidate image texture intensity data.

18. Apparatus for generating a descriptor of at least part of an image, the apparatus comprising:
at least one processor; and
at least one memory including computer program instructions,
the at least one memory and the computer program instructions being configured to, with the at least one processor, cause the apparatus to perform a method of generating a descriptor of at least part of an image, comprising:
a) receiving image data representing the at least part of the image, wherein the image data includes pixel intensity data indicative of a pixel intensity of pixels of the at least part of the image for one or more color channels;
b) processing the image data to identify at least one texture characteristic of the at least part of the image, wherein the processing the image data includes applying at least one filter to the image data, and wherein the processing the image data produces texture data indicative of a texture of the at least part of the image;

c) processing the texture data with at least the pixel intensity data, wherein the processing the texture data includes weighting the texture data with the pixel intensity data for each of the one or more color channels, and wherein the processing the texture data produces texture intensity data indicative of an intensity of at least one texture characteristic for each of the one or more color channels; and, subsequently, d) generating the descriptor of the at least part of the image using the texture intensity data.

19. The apparatus according to claim 18, the processing in b) including generating color channel image data for each of the one or more color channels, and processing the color channel image data to identify at least one texture characteristic of the at least part of the image for each of the one or more color channels, thereby generating the texture data for each of the one or more color channels.

20. The apparatus according to claim 18, wherein the pixel intensity data is indicative of pixel intensity values, each representative of a respective pixel intensity of a pixel of the pixels, and the texture data is indicative of texture values, each representative of a respective texture of a pixel of the pixels, and the weighting the texture data with the pixel intensity data in c) comprises, for each of the pixels, multiplying one of the pixel intensity values with a corresponding one of the texture values.

* * * * *